Patented July 2, 1946

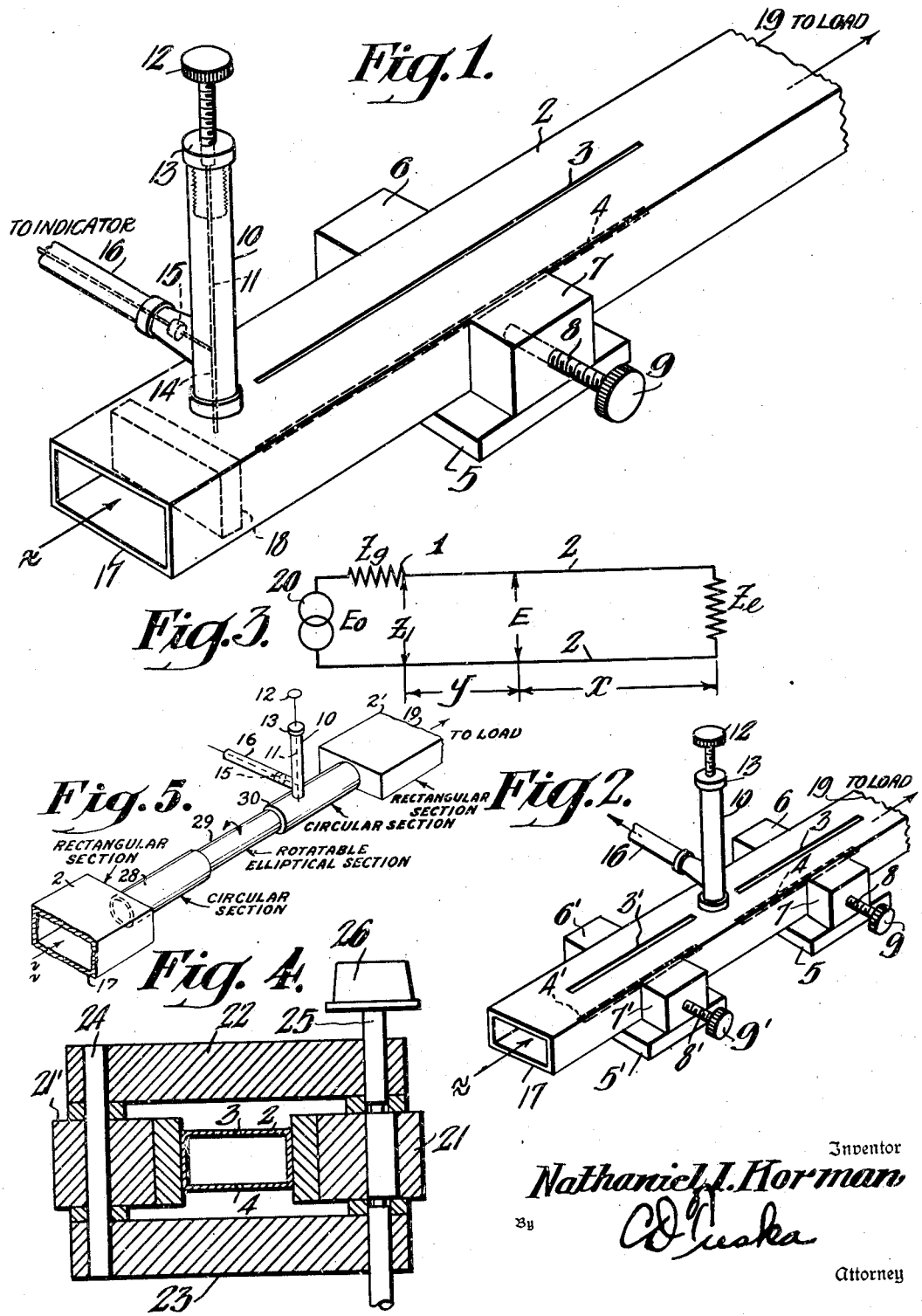

2,403,289

UNITED STATES PATENT OFFICE 2,403,289

STANDING WAVE DETECTOR FOR CENTIMETER WAVES

Nathaniel I. Korman, Haddon Heights, N. J., assignor to Radio Corporation of America, a corporation of Delaware Application December 26, 1942, Serial No. 470,297

12 Claims. (Cl. 178—44)

This invention relates generally to centimeter wave transmission circuits and particularly to a standing-wave detector for centimeter waves which are transmitted through a wave guide or other enclosed transmission line.

Conventional standing wave detectors usually consist of a transmission line or wave guide having a slot along its length, and a probe which may be inserted through the slot and moved throughout the length of the wave guide. The ratio of maximum voltage to minimum voltage derived from the probe is known as the standing-wave ratio. However, the moving probe type of standing-wave detector has been found to provide inaccurate indications when used with wave guides for centimeter waves. This inaccuracy appears to be caused by reflections due to the relatively wide slot which is required, and also to variations of contact impedance between the probe and the wave guide surfaces. The indication variations are often of the order of low amplitude standing-waves which it is desired to measure.

It should be understood that the term "transmission line," as used herein, is intended to include both wave guides and coaxial or other enclosed transmission lines.

The instant invention consists of one or more stationary probes and means for varying the electrical distances between the probe and the source of reflections to be measured. A device for varying the electrical distance between the probe and the source of reflections is known as a "line stretcher." This device utilizes the characteristic of rectangular type wave guides in which the phase velocity depends upon the width of the guide. The electrical length of the guide therefore depends upon the guide width. The guide is provided with a long, narrow slot in each of its broad faces, and the width of the slot is mechanically adjusted to change the effective guide width. Since the slot is parallel to the direction of current flow in the guide, it produces only slight reflection due to the extremely small slot width.

Another device for varying the electrical distance between the probe and the source of reflections makes use of the properties of circularly polarized waves. A circularly polarized wave can be considered to be made up of two equal linearly polarized components in time and space quadrature with respect to each other. If a circularly polarized wave is transmitted through a device which shifts the time phase of one of these components 180° with respect to the other component, the resultant wave will still be circularly polarized but reversed in sense of polarization. If this device, which may be called a 180° polarizer, is rotated, the electrical phase of the output can be shown to change as much as 360°. This change of phase is equivalent to a change in electrical length, and consequently the 180° polarizer may be used in combination with two 90° polarizers, one to change linear polarization to circular and the other to change back to linear polarization after transmission through the 180° polarizer, as described hereinafter for a standing-wave detector. This system would have application for measuring standing-waves in circular wave guides excited in the $H_{11}$ mode or any other mode which has the property of polarization. It would also have application for measuring standing-waves in transmission lines and wave guides which could be coupled to it without appreciable reflection at the coupling. These polarizers can be constructed in several ways, the simplest is to cause the wave to go through a round guide which has been deformed into an elliptical shape for a short distance by pressure from a clamp or vise. The phase may be controlled within the 180° polarizer by rotating it with respect to the two fixed 90° polarizers.

The phase shifting properties of a 180° polarizer acting upon a circularly polarized wave may be demonstrated mathematically as follows:

A circularly polarized wave traveling in a waveguide towards the load is:

(1) $\quad W = i \cos\left(\omega t - \frac{2\pi x}{\lambda}\right) + j \sin\left(\omega t - \frac{2\pi x}{\lambda}\right)$ The axes may be rotated through an angle $x$ by the transformation $$\begin{cases} i = l \cos x - m \sin x \\ j = l \sin x + m \cos x \end{cases}$$

where $l$ and $m$ are new unit vectors at right angles to each other.

(2) $\quad W = l \cos\left(\omega t - \frac{2\pi x}{\lambda}\right) \cos x -$
$m \cos\left(\omega t - \frac{2\pi x}{\lambda}\right) \sin x + l \sin\left(\omega t - \frac{2\pi x}{\lambda}\right) \sin x$
$+ m \sin\left(\omega t - \frac{2\pi x}{\lambda}\right) \cos x$ (3) $\quad W = l \cos\left(\omega t - \frac{2\pi x}{\lambda}\right) + m \sin\left(\omega t - \frac{2\pi x}{\lambda} - x\right)$ The effect of a 180° plate is to change the phase of the $m$ component by 180° and leave the $l$ component unchanged, hence (4) $\quad W' = l\cos\left(\omega t - \frac{2\pi x}{\lambda} - x\right) - m\sin\left(\omega t - \frac{2\pi x}{\lambda} - x\right)$ since $\begin{cases} l = i\cos x + j\sin x \\ m = i\sin x + j\cos x \end{cases}$ (5) $\quad W' = i\cos\left(\omega t - \frac{2\pi x}{\lambda} - x\right)\cos x +$ $j\cos\left(\omega t - \frac{2\pi x}{\lambda} - x\right)\sin x +$ $i\sin\left(\omega t - \frac{2\pi x}{\lambda} - x\right)\sin x -$ $j\sin\left(\omega t - \frac{2\pi x}{\lambda} - x\right)\cos x$ (6) $\quad W' = i\cos\left(\omega t - \frac{2\pi x}{\lambda} - 2x\right) -$ $j\sin\left(\omega t - \frac{2\pi x}{\lambda} - 2x\right)$ The negative sign before the $j$ term indicates reversed sense of polarization. The presence of the angle $2x$ in each of the terms indicates a phase shift of $2x$.

It should be understood that the circular polarization type of line-stretcher described may be merely substituted for the variable line width type line-stretcher in the various modifications of the invention to be described hereinafter.

It will be shown that if the effective internal impedance of the wave generator is of a value whereby the generator end of the wave guide is substantially reflectionless, the ratio of maximum to minimum voltage indicated by the probe, as the electrical distance from the probe to the load is varied, is the standing-wave ratio. It will also be shown hereinafter that if the wave generator end of the wave guide is a substantially perfect reflector, and if the distance between the wave generator and probe is correctly selected, the ratio of maximum to minimum voltage indicated by the probe, as the electrical distance between the probe and the load is varied, is the standing-wave ratio squared. It will also be shown that if the generator end of the wave guide is neither reflectionless nor a perfect reflector, that by the use of another line stretcher between the generator and the probe the error due to the generator-end reflections can be evaluated and corrected for.

Among the objects of the invention are to provide a new and improved method of and means for measuring standing-waves in an ultra-high frequency transmission line or wave guide. Another object is to provide an improved method of and means for indicating the standing-wave ratio in an ultra-high frequency transmission circuit. Still another object is to provide an improved method of and means for indicating standing-waves in an ultra-high frequency wave guide which includes a fixed ultra-high frequency wave probe and means for varying the effective width of one dimension of the wave guide. Another object is to provide an improved method of and means for detecting standing-waves in an ultra-high frequency transmission line which includes at least one fixed probe and means for varying the electrical length of the transmission line between the probe and the source of reflections.

The invention will be further described by reference to the accompanying drawing of which Figure 1 is a perspective view of one embodiment thereof, Figure 2 is a perspective schematic view of a second embodiment utilizing separate "line stretchers" between the generator and probe, and between the probe and the load; Figure 3 is a schematic circuit diagram of an equivalent circuit; Figure 4 is an elevational view of a typical means for varying the electrical length of an ultra-high frequency wave guide; and Figure 5 is a perspective view of a modification of the devices of Figs. 1 and 2. Similar reference numerals are applied to similar elements throughout the drawing.

Referring to Figure 1, a conventional rectangular wave guide 2 includes longitudinal slots 3 and 4, preferably centrally located on each of the wide faces of the guide. The length and width of the slots 3 and 4 may be selected to provide the desired variation of effective electrical length of the guide. A clamping device having a supporting member 5, fixed jaws 6 and 7, and a threaded pressure member 8, is disposed adjacent the narrow sides of the guide in such a manner that rotation of the knob 9, which is connected to the pressure member 8, will vary the width of the wave guide slots 3 and 4. A conventional type wave probe 10 is mounted upon one of the wide faces of the wave guide at any desired point between the wave source and the beginning of the slot 3.

The probe 10 includes an axial central conductor 11 which may be lowered through an aperture in the wave guide face by rotating the adjusting knob 12. The probe is tuned to resonance by rotating the plunger 13 which is threaded into the outer shell of the probe 10. A second conductor 14 is attached, or suitably coupled, to a selected point on the first conductor 11, and connected to one terminal of a detector 15. The remaining terminal of the detector 15 is connected through a suitable transmission line 16 to an indicator, not shown. It should be understood that the detector 15 may be a crystal or any other type of high frequency detector known in the art.

Centimeter waves of a frequency which may be efficiently transmitted by the wave guide are introduced into the guide at its end 17, and may, if desired, be attenuated by means of any suitable high absorption material 18 inserted in the guide, to isolate effectively the generator from the wave guide, thereby providing substantially constant input. The modification utilizing the attenuator between the wave generator and the probe will hereafter be designated the Constant Input type detector, while the modification wherein the generator is directly, but loosely coupled to the wave guide will be designated the Variable Input type.

The waves within the guide are detected by the wave probe, and the effective electrical length of the guide between the probe 10 and a load connected to the other end 19 of the guide is varied by adjusting the clamp adjusting knob 9.

Figure 2 is similar to Figure 1 with the following exceptions: the generator is loosely coupled to the wave guide, the attenuator 18 is omitted, and a second "line stretcher" 5', 7', 9', 3', 4' is inserted in the guide between the generator and the probe for adjusting the electrical distance between said generator and probe.

Referring to Figure 3, the equivalent transmission line circuit of the device described in Figure 1 includes a generator 20 providing a voltage $E_0$ and having an internal impedance of $Z_g$. The generator is connected to a transmission line 2 at the point 1, and the other end of the transmission line is connected to a load circuit having an impedance $Z_e$. The voltage indicated by the probe 10 is represented by the voltage $E$ across the line at the position of the probe. The distance between the generator and the probe is represented by $y$, and the distance between the probe and load is represented by $x$. The characteristic impedance of the transmission line 2 at the point 1 is $Z_0$.

Constant input type detector

Let
$E$ represent the voltage at the voltmeter
$E_G$ represent the voltage at the terminals of the generator
$Z_1$ represent the impedance at the terminals of the generator $$\frac{Z_1}{Z_0} = \frac{\frac{Z_L}{Z_0}\cos(x+y) + j\sin(x+y)}{\cos(x+y) + j\frac{Z_L}{Z_0}\sin(x+y)} \quad (1)$$

$$\frac{E_G}{E_0} = \frac{1}{1+\frac{Z_G}{Z_1}} \quad (2)$$

$$\frac{E}{E_G} = \cos y - j\frac{Z_0}{Z_1}\sin y \quad (3)$$

Combining Equations 1, 2 and 3, and simplifying, $$\frac{E}{E_0} = \frac{\frac{Z_L}{Z_0}\cos x + j\sin x}{\left(\frac{Z_L}{Z_0}+\frac{Z_G}{Z_0}\right)\cos(x+y) + j\left(1+\frac{Z_L Z_G}{Z_0^2}\right)\sin(x+y)} \quad (4)$$

Since the line is dissipationless, $Z_0$ is purely resistive. It can also be assumed without lack of generality that $Z_L$ and $Z_G$ are purely resistive. (If $Z_L$ and $Z_G$ are not actually resistive, a linear transformation $x^1 = x+a$, $y^1 = y+b$, will make them so). The quantities can now be defined $$K = \frac{Z_L}{Z_0} \quad (5)$$

$$\alpha = \frac{Z_G}{Z_0} \quad (6)$$

It is recognized that $K$ is the standing wave ratio caused by the load and $\alpha$ is the standing wave ratio which would be caused if the internal impedance of the generator were used as a load. Equation 4 becomes.

$$\frac{E}{E_0} = \frac{K\cos x + j\sin x}{(K+\alpha)\cos(x+y) + j(1+K\alpha)\sin(x+y)} \quad (7)$$

$$\left|\frac{E}{E_0}\right|^2 = \frac{K^2\cos^2 x + \sin^2 x}{(K+\alpha)^2\cos^2(x+y) + (1+K\alpha)^2\sin^2(x+y)} \quad (8)$$

$$\left|\frac{E}{E_0}\right|^2 = \frac{(K^2+1)+(K^2-1)\cos 2x}{[(K+\alpha)^2+(1+K\alpha)^2] + [(K+\alpha)^2-(1+K\alpha)^2]\cos 2(x+y)} \quad (9)$$

In an ideal constant input type of standing wave detector $\alpha=1$, therefore, $$\left|\frac{E}{E_0}\right|^2 = \frac{(K^2+1)+(K^2-1)\cos 2x}{2(1+K)^2}$$

$$\left|\frac{E}{E_0}\right|^2_{max.} = \frac{2K^2}{2(1+K)^2}$$

$$\left|\frac{E}{E_0}\right|^2_{min.} = \frac{2}{2(1+K)^2}$$

$$\frac{|E|^2_{max.}}{|E|^2_{min.}} = K^2$$

Or, finally $$K = \frac{|E|_{max.}}{|E|_{min.}} \quad (10)$$

If $\alpha$ is not exactly unity, Equation 10 will be in error. This error can be eliminated if two line stretchers are used, one between generator and probe and the other between the line and probe. Consider Equation 9.

$$\left|\frac{E}{E_0}\right|^2 = \frac{(K^2+1)+(K^2-1)\cos 2x}{[(1+K\alpha)^2+(K+\alpha)^2] - [(1+K\alpha)^2-(K+\alpha)^2]\cos 2(x+y)} \quad (9)$$

where $K$ and $\alpha$ are always larger than unity and consequently each of the bracketed terms is always positive When $x=0$, $y=0$, $$\left|\frac{E}{E_0}\right|$$

will be a maximum and will equal $$\left|\frac{E}{E_0}\right|_{x=0,\,y=0} = \frac{K}{K+\alpha} \quad (11)$$

When $$x=\frac{\pi}{2},\,y=0,\,\left|\frac{E}{E_0}\right|$$

will be a minimum and will equal $$\left|\frac{E}{E_0}\right|_{x=\frac{\pi}{2},\,y=0} = \frac{1}{1+K\alpha} \quad (12)$$

If both line stretchers are adjusted for a maximum, $x=0$, $y=0$; and if $x$ is now held fixed, and $y$ considered as the only variable, Equation 9 becomes $$\left|\frac{E}{E_0}\right|^2_{x=0} = \frac{2K^2}{[(1+K\alpha)^2+(K+\alpha)^2] - [(1+K\alpha)^2-(K+\alpha)^2]\cos 2y} \quad (13)$$

$$\left|\frac{E}{E_0}\right|_{x=0}$$

will now be a minimum when $$y = \frac{\pi}{2}$$

and will equal $$\left|\frac{E}{E_0}\right|_{x=0,\,y=\frac{\pi}{2}} = \frac{K}{1+K\alpha} \quad (14)$$

If both line stretchers are adjusted for a minimum, $$x = \frac{\pi}{2}$$

$y=0$; and if $x$ is now held fixed and $y$ considered as the only variable, Equation 9 becomes $$\left|\frac{E}{E_0}\right|^2_{x=\frac{\pi}{2}} = \frac{2}{[(1+K\alpha)^2+(K+\alpha)^2]+[(1+K\alpha)^2-(K+\alpha)^2]\cos 2y} \quad (15)$$

$$\left|\frac{E}{E_0}\right|_{x=\frac{\pi}{2}}$$

will now be a maximum when $$y=\frac{\pi}{2}$$

and will equal $$\left|\frac{E}{E_0}\right|_{x=\frac{\pi}{2},\ y=\frac{\pi}{2}} = \frac{1}{K+\alpha} \quad (16)$$

K can be found from Equations 11 and 16, or from 12 and 14:

$$K = \frac{\left|\frac{E}{E_0}\right|_{x=0,\ y=0}}{\left|\frac{E}{E_0}\right|_{x=\frac{\pi}{2},\ y=\frac{\pi}{2}}} = \frac{\left|\frac{E}{E_0}\right|_{x=0,\ y=\frac{\pi}{2}}}{\left|\frac{E}{E_0}\right|_{x=\frac{\pi}{2},\ y=0}} \quad (17)$$

*Summarizing.*—The standing wave ratio can be found by first adjusting both line stretchers to give maximum probe reading and noting this reading. Next, the line stretcher is readjusted adjacent to the load for minimum probe reading. Then the line stretcher is readjusted adjacent to the generator for maximum probe reading. The ratio of the voltage input to the probe under the first condition to the voltage under the last condition is the standing wave ratio.

Alternatively, the standing wave ratio can be found by adjusting both line stretchers to give minimum probe reading and noting the reading. Next, the line stretcher is readjusted adjacent to the load to give maximum probe reading. Then the line stretcher is readjusted adjacent to the generator for minimum probe reading. The ratio of the voltage input to the probe under the last condition to the voltage under the first condition is the standing wave ratio. Practically, the more refined methods of determining the standing wave ratio are only necessary when extreme accuracy is required.

*Variable input type detector*

The treatment of the variable input type standing wave detector is the same as that for the constant input type considered heretofore, as far as Equation 9. For convenience Equation 9 is repeated herewith as Equation 18:

$$\left|\frac{E}{E_0}\right|^2 = \frac{(K^2+1)+(K^2-1)\cos 2x}{[(K+\alpha)^2+(1+K\alpha)^2]+[(K+\alpha)^2-(1+K\alpha)^2]\cos 2(x+y)} \quad (18)$$

In an ideal variable input standing wave detector $\alpha=0$. Hence $$\left|\frac{E}{E_0}\right|^2 = \frac{(K^2+1)+(K^2-1)\cos 2x}{(K^2+1)+(K^2-1)\cos 2(x+y)} \quad (19)$$

In this equation $x$ is to be considered as the independent variable and $y$ as a parameter.

$$\frac{|E|_{max.}}{|E|_{min.}}$$

will be a maximum if $$y=\frac{\pi}{2}$$

Therefore:

$$\left|\frac{E}{E_0}\right|^2 = \frac{(K^2+1)+(K^2-1)\cos 2x}{(K^2+1)-(K^2-1)\cos 2x} \quad (20)$$

$$\left|\frac{E}{E_0}\right|^2_{max.} = K^2$$

$$\left|\frac{E}{E_0}\right|^2_{min.} = \frac{1}{K^2}$$

$$\frac{|E|_{max.}}{|E|_{min.}} = K^2 \quad (21)$$

If the internal resistance of the generator does not have a negligible effect, Equation 21 will be in error. However, if it can be assumed that this internal resistance is constant with load changes, it can be corrected for the error as follows:

Consider Equation (18).

$$\left|\frac{E}{E_0}\right|^2 = \frac{(K^2+1)+(K^2-1)\cos 2x}{[(K+\alpha)^2+(1+K\alpha)^2]+[(K+\alpha)^2-(1+K\alpha)^2]\cos 2(x+y)} \quad (18)$$

where $\alpha$ is positive but less than unity, K is greater than unity, and consequently each of the bracketed terms are always positive. The maximum value of $$\left|\frac{E}{E_0}\right|$$

occurs when $x=0$, $$y=\frac{\pi}{2}$$

and is equal to $$\left|\frac{E}{E_0}\right|_{x=0,\ y=\frac{\pi}{2}} = \frac{K}{1+K\alpha} \quad (11)$$

When $x=0$ $$\left|\frac{E}{E_0}\right|^2_{x=0} = \frac{2K^2}{[(K+\alpha)^2+(1+K\alpha)^2]+[(K+\alpha)^2-(1+K\alpha)^2]\cos 2y} \quad (22)$$

When $y=0$, $$\left|\frac{E}{E_0}\right|_{x=0}$$

will be a minimum.

$$\left|\frac{E}{E_0}\right|_{x=0,\ y=0} = \frac{K}{K+\alpha} \quad (23)$$

The minimum value of $$\left|\frac{E}{E_0}\right|$$

occurs when $$x=\frac{\pi}{2},\ y=\frac{\pi}{2}$$

$$\left|\frac{E}{E_0}\right|_{x=\frac{\pi}{2},\ y=\frac{\pi}{2}} = \frac{1}{K+\alpha} \quad (24)$$

When $$x=\frac{\pi}{2}$$

$$\left|\frac{E}{E_0}\right|^2_{x=\frac{\pi}{2}} = \frac{2}{[(K+\alpha)^2+(1+K\alpha)^2]-[(K+\alpha)^2-(1+K\alpha)^2]\cos 2y} \quad (25)$$

When $y=0$, $$\left|\frac{E}{E_0}\right|_{x=\frac{\pi}{2}}$$

will be a maximum.

$$\left|\frac{E}{E_0}\right|_{x=\frac{\pi}{2},\ y=0} = \frac{1}{1+K\alpha} \quad (26)$$

K can be found from Equations 11, 23, 24 and 26

$$K = \sqrt{\frac{\left|\frac{E}{E_0}\right|_{x=0,\ y=\frac{\tau}{2}} \cdot \left|\frac{E}{E_0}\right|_{x=0,\ y=0}}{\left|\frac{E}{E_0}\right|_{x=\frac{\tau}{2},\ y=\frac{\tau}{2}} \cdot \left|\frac{E}{E_0}\right|_{x=\frac{\tau}{2},\ y=0}}} \qquad (27)$$

*Summarizing.*—The standing wave ratio can be found by first adjusting both line stretchers to give maximum probe reading and denoting the voltage input to the probe under this condition as $R_{max.}$. Secondly, the generator-end line stretcher is readjusted for a minimum and the voltage is denoted as $R_{max./min.}$. Thirdly, both line stretchers are adjusted for minimum and the voltage is denoted as $R_{min.}$. Fourth, the generator-end line stretcher is readjusted for a maximum and the voltage is denoted as $R_{min./max.}$. The standing-wave ratio is then given by the expression $$K \sqrt{\frac{R_{max.}}{R_{min.}}} \cdot \sqrt{\frac{R_{max./min.}}{R_{min./max.}}} \qquad (28)$$

The second radical in Equation 28 is in the nature of a correction term which is different from unity only when the internal resistance of the generator is appreciable.

Figure 4 is the mechanical linkage which comprises a preferred means for varying the physical width of the wave guide to provide a "line stretcher." The wave guide 2 having slots 3 and 4 is supported between two bearings 21, 21'. The bearings are connected at their ends by links 22, 23 which have clearance holes for the shafts 24, 25 extending through the bearings 21, 21'. The bearing 21' and the shaft 24 are plain, while the bearing 21 is enlarged to accommodate an eccentric center portion of the shaft 25. The end of the eccentric shaft 25 is fitted with an adjusting knob 26, or other drive means. As the eccentric shaft 25 is turned, pressure is applied to the wave guide to vary its width and thus its effective electrical length.

Figure 5 shows a modification of the embodiments of the invention shown in Figs. 1 and 2 wherein the principles thereof are applied to circularly polarized waves as described in detail heretofore.

Linear polarized waves introduced into the rectangular waveguide 2 are converted into circularly polarized quadrature waves in the first circular waveguide 28. Next they pass through an elliptical waveguide section 29, which shifts the relative phases of the quadrature waves 180°. Rotation of the elliptical section provides adjustment of the phase shift, and hence the effective electrical length of the guide. Upon entering the second circular waveguide section 30, the phase shifted waves may be measured in the same manner as previously described. If desired the waves may be converted again to linear polarization by introduction to a second rectangular waveguide 2'.

Thus the device described comprises an improved standing-wave detector wherein at least one wave probe is mounted in a fixed position on one of the faces of a wave guide, and the effective electrical length of the guide between the probe and the load or other source of wave reflections, is varied by adjusting mechanically the width of the wave guide.

I claim as my invention:

1. A standing wave detector for the field within an ultra-high frequency wave guide which includes a wave probe, fixed means for subjecting said probe to said field within said wave guide, and means for mechanically adjusting only one dimension of said guide normal to the longitudinal axis of said guide to vary the phase velocity of said field.

2. A standing wave detector for the magnetic field within an ultra-high frequency wave guide which includes a wave probe, fixed means for subjecting said probe to said field within said wave guide, and means for mechanically adjusting only one dimension of said guide normal to the longitudinal axis of said guide to vary the phase velocity of said field.

3. Apparatus of the type described in claim 1 including means for adjusting the area of said probe subjected to said field.

4. A standing wave detector for the field within an ultra-high frequency wave guide which includes a wave probe, fixed means for subjecting said probe to said field within said wave guide, means forming at least one longitudinal slot in said guide and means for adjusting the width of said waveguide by deformation of said slot forming means to vary the phase velocity of said field.

5. Apparatus of the type described in claim 4 including means for tuning said probe to resonate at said frequency.

6. A standing wave detector for the field within an ultra-high frequency wave guide which includes a wave probe, fixed means for subjecting said probe to said field within said wave guide, means forming at least one longitudinal slot in said guide and compression means for adjusting the width of said waveguide by deformation of said slot forming means to vary the phase velocity of said field.

7. A standing wave detector for the field within an ultra-high frequency waveguide transmission line which includes a wave probe, fixed means for subjecting said probe to said field within said line, a source of field reflections in said line, and means disposed between said probe and said source of reflections for mechanically adjusting only one dimension of said line normal to the longitudinal axis of said line to vary the effective length of said reflection path.

8. The method of detecting standing waves within an ultra-high frequency waveguide having a stationary wave probe comprising detecting said waves, and adjusting at least one dimension of said waveguide normal to the longitudinal axis thereof to derive at said probe voltage maxima and minima in said waveguide.

9. A standing wave detector for the field within an ultra-high frequency wave guide connected between a generator and a load which includes a probe, fixed means for subjecting said probe to said field within said waveguide, means disposed between said probe and said load for mechanically adjusting only one transverse dimension of a first portion of said guide for varying the electrical distance from said probe to said load, and second means disposed between said probe and said generator for mechanically adjusting said one transverse dimension of a second portion of said guide for varying the electrical distance from said probe to said generator.

10. A standing wave detector for the field within a circular ultra-high frequency wave guide connected between a generator and a load and having at least one source of wave reflections which includes a probe, fixed means for subjecting said probe to said field within said line, means disposed between said reflection source and said probe for circularly polarizing said waves, means including an adjustably rotatable elliptical waveguide section interposed between said reflection source and said probe for varying the phase of said circularly polarized waves, and means for converting said circularly polarized waves to plane polarized waves.

11. Apparatus of the type described in claim 10 including at least one other source of wave reflections, and second circular polarizing means, second phase varying means and polarization conversion means disposed between said probe and said other reflection source.

12. A line-stretcher comprising a longitudinally slotted ultra-high-frequency wave guide wherein only one transverse dimension may be varied by applying compression thereto and including two parallel disposed bearings in operable relation to said guide for varying substantially only said one transverse dimension, a cylindrical shaft through one of said bearings, an eccentric shaft through the other of said bearings, two link members disposed between the ends of said bearings each adapted to receive both of said shafts, and means for rotating said eccentric shaft for applying compression through said bearings to said guide to vary said transverse dimension thereof.

NATHANIEL I. KORMAN.